Oct. 30, 1928.
S. B. HARVEY
1,689,433
CONDENSER CAGE FOR INTAKE MANIFOLDS
Filed Sept. 3, 1925
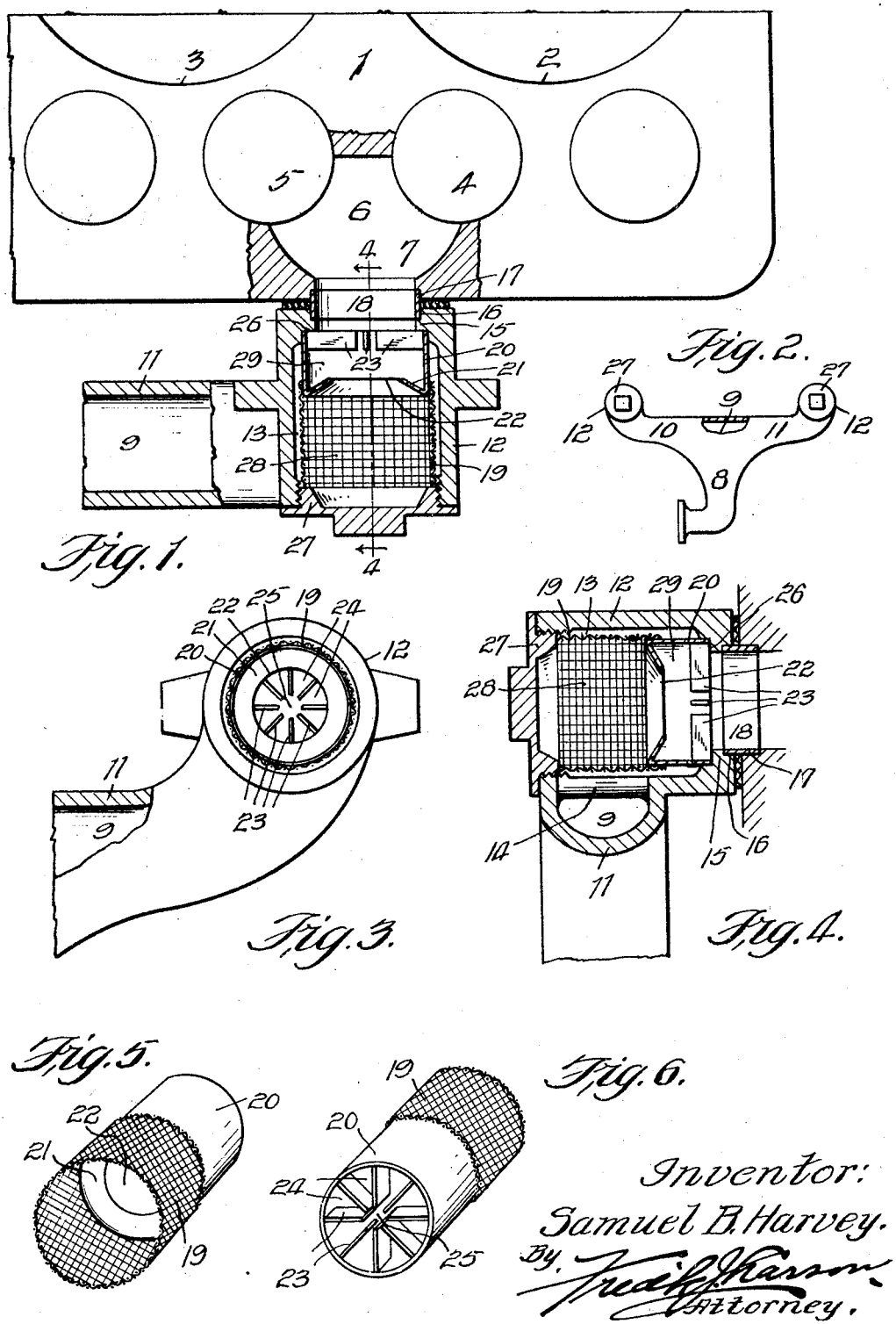

Patented Oct. 30, 1928.

1,689,433

UNITED STATES PATENT OFFICE.

SAMUEL B. HARVEY, OF WELLSTON, MISSOURI.

CONDENSER CAGE FOR INTAKE MANIFOLDS.

Application filed September 3, 1925. Serial No. 54,174.

My invention relates to a condenser cage for gasoline intake manifolds used in connection with internal combustion engines, and, it is a distinct and practical improvement to overcome certain practical objections to, and defects in the so-called vaporizers now in use, and, it is an improvement over the cage shown in my U. S. Letters Patent Number 1,523,524, of January 20th, 1925.

The object of my present invention is to provide a condenser cage provided with a tapered opening intermediate its ends to cause a central flow of gaseous fuel which will have a direct impingement upon a plurality of radially disposed flat faced rods at and within the exit end of the cage for thoroughly mixing the fuel so as to cause it to burn brighter.

A further object of the invention is the provision of a condenser cage which will permit of the proper adjustment of the carbureter at the spray nozzle thereof and thereby prevent back fire or flushing back of the fuel to its source of supply.

A further object of the invention is to provide a condenser cage for intake manifolds, which possesses advantages in points of simplicity and efficiency, and, at the same time proves itself comparatively inexpensive in cost of manufacture.

With the above and other objects in view, the invention consists in the novel features of construction, arrangement and combination of parts hereinafter more fully described and finally pointed out in the claims hereto appended.

Referring to the accompanying drawings forming a part of this specification, wherein like characters of reference denote similar parts throughout the several views:

Fig. 1, is a top plan view of a motor block with its head removed and a portion of an intake manifold showing my condenser cage applied thereto.

Fig. 2, is a front elevation of the manifold.

Fig. 3, is a sectional view taken on line 3—3 of Fig. 1, looking in the direction of the arrow.

Fig. 4, is a sectional view taken on line 4—4 of Fig. 1, looking in the direction of the arrow.

Fig. 5, is a perspective view of a condenser cage embodying the features of my invention.

Fig. 6, is a perspective view of the condenser cage looking from the opposite end thereof.

Referring to the drawings, the reference character 1 designates a portion of a motor block; the numerals 2 and 3 represent cylinders and the numerals 4 and 5, respectively represent intake valves to said cylinders. The numeral 6 designates the cylinder port leading to the intake valves 4 and 5 of said cylinders, while 7 designates a seat concentric with the cylinder intake port 6.

The reference numeral 8 represents an intake manifold having the main gas passage 9 within the arms 10 and 11 thereof. The arms 10 and 11 are each provided at their ends with a suitable tubular head 12 disposed at a right angle to the passage of the arms 10 and 11 and they extend beyond the inner side face of the manifold arms 10 and 11, as will be apparent from Fig. 1. The heads 12 are each provided with a horizontally disposed gasoline vapor condensing chamber 13 provided with the lower opening 14 for communication with the main passage 9, so as to permit gasoline vapor to freely flow upwardly into the gasoline vapor condensing chamber 13. The heads 12 are each provided at their inner ends with the internal flange 15 having a ring seat 16. A suitable ring 17 is interposed between the ring seat 16 of the flange 15 and the motor block to form a constricted fuel passage 18 which leads to the intake port 6, as clearly shown in Figs. 1 and 4.

The means for condensing the gasoline vapor within the heads 12 will now be described.

Disposed within each chamber 13 of each head 15 is a tubular condenser cage consisting of a suitable tubular wire mesh outer end portion 19 and an imperforated tubular metallic inner end portion 20 which are suitably united at their inner ends, as shown in Figs. 5 and 6. The wire mesh end 19 of the cage is open at both ends.

The imperforated tubular metallic end 20 of the condenser cage is provided at its inner end portion with an internal inclined or converging metallic flange or baffle wall 21 having a suitable central opening 22 to form a nozzle. The wall 21 is directed toward the outer end of the cage. This wall is formed by folding in the rear edge of the imperforated metallic end portion 20 of the cage. It may, of course, if desired, be a separate piece inserted into the inner end of the imperforated metallic end portion 20 of the cage. The outer end of the imperforated metallic end portion 20 of the cage is provided with a plurality of radially disposed flat faced rods 23 which are fixed at their outer ends to the discharge end of the imperforated tubular metallic end portion 20 of the cage extending inwardly into the passageway formed by the imperforated tubular member 20 for mixing the gaseous mixture. These rods are directed toward the center of the outlet end of the imperforated cage member 20 to provide a plurality of angular passages 24 between the rods and a central passage 25 at the inner ends of the rods, as clearly shown in Figs. 2 and 6. The passage 25 is concentric with the baffle wall opening 22.

A condenser cage is disposed within the chamber 13 of each head 12 between an internal seat 26 and an outer end closure 27 which has screw threaded connection with the head 12, which end closure holds the condenser cage in its proper position within the chamber 13 of each head 12. The tubular wire mesh end portion 19 of the condenser cage is preferably a little smaller in diameter than the diameter of the head chamber 13 thereby allowing a free flow of vapor gas into the cage completely around the wire mesh end portion 19 of the cage.

It will be observed that the tubular wire mesh end portion 19 of the cage is at all times saturated with liquid fuel from which it is delivered through the tubular metallic end portion 20 of the cage to the cylinders. In passing from the tubular wire mesh end portion 19 of the cage through the imperforated tubular end portion 20 thereof, it is subjected to resistance in passing over the baffle converging wall 21 and over the flat faced rods 23 which permits of a proper adjustment of the carbureter so as to feed a mixture to the engine cylinders which will burn fine and make the motor run smooth with abundance of power. The condenser cage will eliminate the sluggishness in a motor due to feeding the fuel in a properly mixed state.

The baffle wall 21 and flat faced rods 23 have a tendency to prevent the fuel from flashing back to its original source of supply in the carbureter.

It will be observed that the condenser cage provides two chambers, namely a chamber 28 within the tubular wire mesh end portion 19 of the imperforated cage and a chamber 29 within the tubular metallic end portion 20 of the cage, the two chambers being in communication with each other through the baffle wall opening 22. Any fuel condensing within the chamber 29 will not flow back to its source of supply, but any fuel condensing in chamber 28 will saturate the tubular wire mesh end portion 19 of the cage, thus the cage acts as an auxiliary carbureter for supplying fuel to be frictionally washed in passing through the imperforated tubular metallic end 20 of the cage, as is manifest.

It is evident from the foregoing description that the mixture of gasoline and air from the carbureter passes out of arms 10 and 11 in an upwardly direction into the head chamber 13, thus around and through the tubular wire mesh end portion of the cage. After the fuel has been intercepted by the tubular wire mesh end portion 19 of the cage, the gaseous vapor is passed over the inclined or tapered baffle wall 21 which sets up a certain resistance thereto and from here the gas passes to the cage chamber 29 and out of the same between the radially directed flat faced rods 23 within the passageway 29 into the cylinder port 6 from where it is delivered to the engine cylinders in communication therewith.

It will be observed that the baffle wall with its central opening acts in much the way of a nozzle and causes a central flow of gaseous fuel from the condensing end of the cage for direct impingement on the flat surfaces of the rods 23 to cause the gas delivered over same to thoroughly mix so as to burn brighter, thereby resulting in a smooth running motor, eliminating carbon and conserving in fuel consumption due to a proper mixing thereof which is brought about by the friction set up by its contact, first with the baffle wall and then by the friction fingers.

The many advantages of the herein described invention will readily suggest themselves to those skilled in the art to which it appertains.

I do not wish to be understood as having limited myself to the exact details of construction shown and described, but desire to have it understood that the invention I have shown in the drawings is merely illustrative, as it is manifest that various minor changes may be made in the exact construction and particular arrangement of parts without departing from the spirit of my invention, hence I reserve the right to make any such changes, or modifications as may fairly fall witin the scope of the appended claims when fairly construed.

What I claim is:

1. In a condenser cage for intake manifolds of internal combustion engines, a cylindrical tubular cage member having a section of wire mesh material and a section of imperforated material united as a unit, rods disposed at the outer end of the imperforated section and extending inwardly into the passageway formed by the tubular member and means disposed at the inner end of the section of non-wire mesh material for directing a central flow of gaseous mixture from the section of wire-mesh material through the section of imperforated material for direct impingement against said rods.

2. A condenser cage for intake manifolds comprising a tubular member one end of which is wire mesh material and the other end imperforated material, rods extending inwardly into the passageway formed by the tubular member for mixing a gaseous mixture, a tapered baffle wall having a central opening disposed within the imperforated end of the tubular member for directing a nozzle flow of gaseous mixture through the imperforated end of the tubular member for impingement against said rods.

3. A condenser cage for intake manifolds comprising a tubular member one end of which is formed of wire mesh material and the other end of imperforated material, rods having flat side faces extending into discharge end of the passageway formed by the imperforated end of the tubular member and a tapered baffle partition having a central opening disposed at the juncture of the wire mesh and imperforated ends of the tubular member for directing a flow of gaseous mixture against and around said rods.

4. A condenser cage for intake manifolds comprising a tubular element one end of which is formed of wire mesh material and the other end of imperforated material, a baffle wall having a central opening disposed within the cage at the inlet end of the imperforated end of the cage and radially disposed rods at and within the outlet end of said imperforated end of the cage.

5. A condenser cage for intake manifolds comprising a cylindrical tubular cage member having a section thereof formed of wire mesh material and a section thereof formed of imperforated material for condensing surplus gaseous fuel at the wire mesh section of the cage, flat faced rods carried at and extending into the passageway of the imperforated section of the cage and at the outlet end thereof, an internal baffle having a converging wall provided with a central opening arranged at the juncture of the wire mesh and imperforated sections of the cage for directing a nozzle flow of gaseous mixture from the wire mesh section of the cage through the imperforated section thereof and over the aforesaid rods.

6. A condenser cage for intake manifolds comprising a tubular element having the intake portion thereof formed of wire mesh material and the discharge portion thereof formed of imperforated material, a baffle having a central nozzle opening disposed within the tubular member adjacent the discharge end of the wire mesh portion thereof and a multiplicity of flat radially disposed members fixed at their outer ends to and within the discharge end of the tubular element with the inner ends thereof separated from each other to provide a central opening in axial alignment with the nozzle opening.

7. A condenser cage for intake manifolds of internal combustion engines comprising a cylindrical tubular cage member consisting of a rear tubular wire mesh section, a forward imperforated tubular section, an interior nozzle at the juncture of said sections integral with the inner end of the imperforated tubular section and rods extending inwardly into the passage formed by the imperforated tubular section.

8. A condenser cage for intake manifolds of internal combustion engines comprising a cylindrical tubular cage member consisting of a rear wire mesh section, a forward imperforated tubular section and rods extending inwardly from the wall of the imperforated section into the passageway thereof with their inner ends spaced apart for mixing a gaseous mixture sucked through the passageway of the tubular cage member.

In testimony whereof I have hereunto affixed my signature.

SAMUEL B. HARVEY.